(12) United States Patent
Li

(10) Patent No.: US 7,929,739 B2
(45) Date of Patent: Apr. 19, 2011

(54) IMAGE PROCESSING METHOD, APPARATUS, AND PROGRAM

(75) Inventor: Yuanzhong Li, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1036 days.

(21) Appl. No.: 11/785,340

(22) Filed: Apr. 17, 2007

(65) Prior Publication Data

US 2008/0044080 A1 Feb. 21, 2008

(30) Foreign Application Priority Data

Apr. 17, 2006 (JP) .................................. 2006-112958
Mar. 29, 2007 (JP) .................................. 2007-088428

(51) Int. Cl.
G06K 9/00 (2006.01)
G06K 9/62 (2006.01)
G06K 9/34 (2006.01)
G06K 9/46 (2006.01)

(52) U.S. Cl. ......... 382/128; 382/159; 382/180; 382/203

(58) Field of Classification Search .................. 382/182, 382/159, 180, 199, 203

See application file for complete search history.

(56) References Cited

U.S. PATENT DOCUMENTS

| | | | | |
|---|---|---|---|---|
| 5,319,549 A * | 6/1994 | Katsuragawa et al. | ....... | 382/108 |
| 5,987,094 A * | 11/1999 | Clarke et al. | .................... | 378/62 |
| 6,549,646 B1 * | 4/2003 | Yeh et al. | ....................... | 382/132 |
| 6,738,499 B1 * | 5/2004 | Doi et al. | ....................... | 382/128 |
| 6,760,468 B1 * | 7/2004 | Yeh et al. | ....................... | 382/132 |
| 6,973,212 B2 * | 12/2005 | Boykov et al. | ................ | 382/173 |
| 7,298,877 B1 * | 11/2007 | Collins et al. | ................. | 382/128 |
| 7,474,775 B2 * | 1/2009 | Abramoff et al. | ............. | 382/128 |
| 7,492,944 B2 * | 2/2009 | Narayanan et al. | ........... | 382/180 |
| 7,536,050 B2 * | 5/2009 | Boykov et al. | ................ | 382/173 |
| 2002/0172403 A1 * | 11/2002 | Doi et al. | ....................... | 382/128 |
| 2007/0154099 A1 * | 7/2007 | He et al. | ....................... | 382/224 |

FOREIGN PATENT DOCUMENTS

JP 2003-250794 A 9/2003

OTHER PUBLICATIONS

Pham et al. "A survey in current methods in medical image segmentation" Annual Review of Biomedical Segmentation, vol. 2, 2000, pp. 315-337.*

(Continued)

*Primary Examiner* — Bhavesh M Mehta
*Assistant Examiner* — Utpal Shah
(74) *Attorney, Agent, or Firm* — Sughrue Mion, PLLC

(57) ABSTRACT

Machine learning for learning a characteristic amount of each pixel in a plurality of sample images, each including a particular region with a known contour, is performed in advance to obtain an evaluation function capable of evaluating whether or not each pixel is a pixel representing the contour based on the characteristic amount thereof. An arbitrary point is set within a particular region in an input image, and a discrimination region including the particular region is set in the input image with reference to the arbitrary point. A characteristic amount is obtained from each pixel within the discrimination region, then based on the characteristic amount, an evaluation value indicating whether or not each pixel within the discrimination region is a pixel representing the contour is calculated using the evaluation function, and the contour of the particular region in the input image is determined based on the evaluation value.

20 Claims, 11 Drawing Sheets

OTHER PUBLICATIONS

Oweis et al. "A combined neuro-fuzzy approach for classifying image pixels in medical applications" Journal of Electrical Eng., vol. 56 No. 5-6, 2005, pp. 146-150.*

Kazunori Okada, et al., "Robust Anisotropic Gaussian Fitting for Volumetric Characterization of Pulmonary Nodules in Multislice CT", IEEE Transactions on Medical Imaging, Mar. 2005, pp. 409-423, vol. 24, No. 3.

Sheila Timp, et al., "A new 2D segmentation method based on dynamic programming applied to computer aided detection in mammography" Medical Physics, May 2004, pp. 958-971, vol. 31, No. 5, Department of Radiology, University Medical Center, Nijmegen, The Netherlands.

Yuri Y. Boykov, et al., "Interactive Graph Cuts for Optimal Boundary & Region Segmentation of Objects in N-D Images", Proceedings of "Internation Conference on Computer Vision", Jul. 2001, pp. 105-112, vol. I, Vancouver, Canada.

* cited by examiner

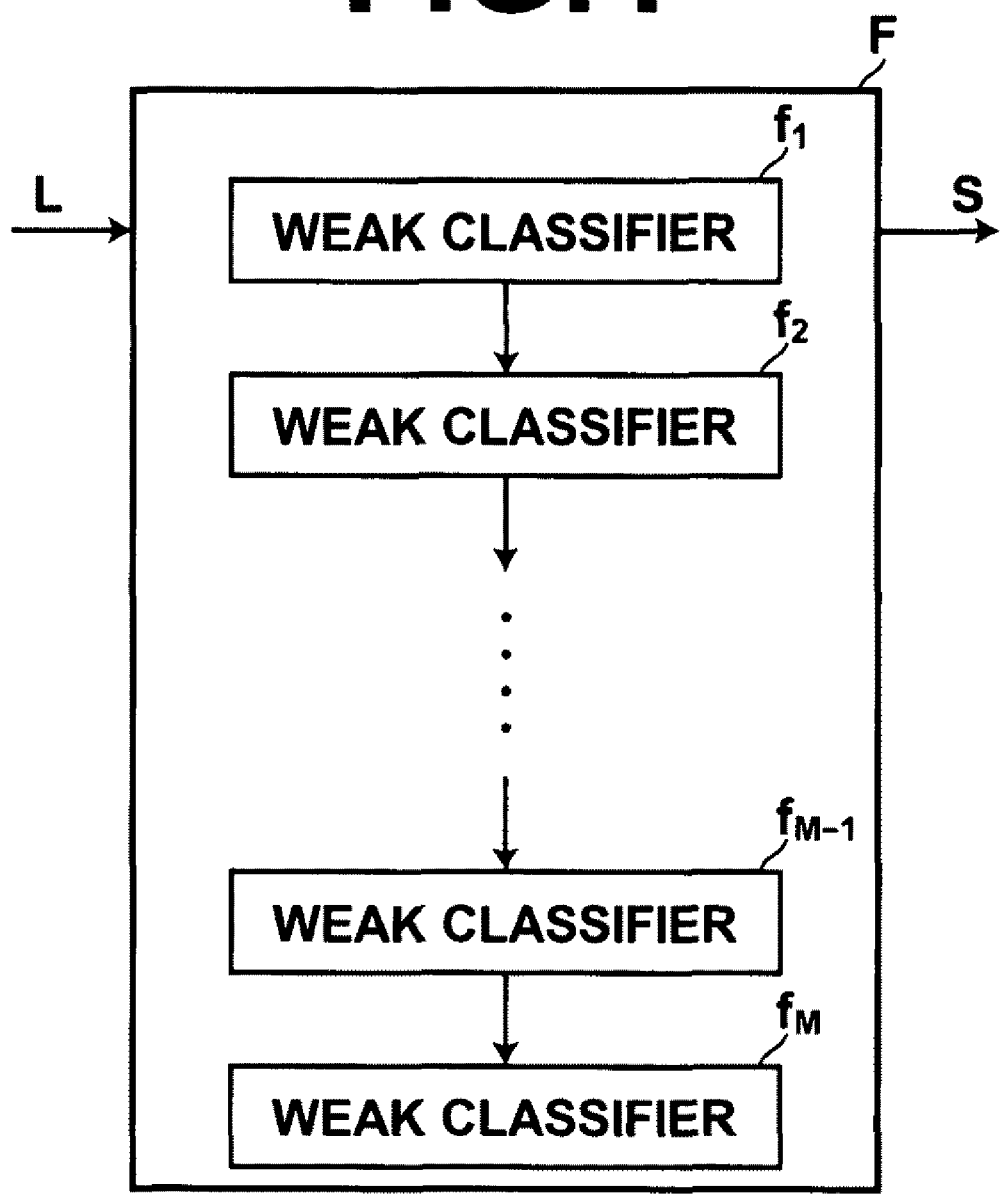

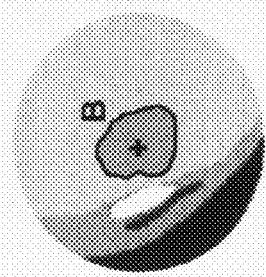
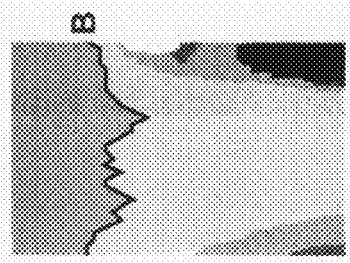
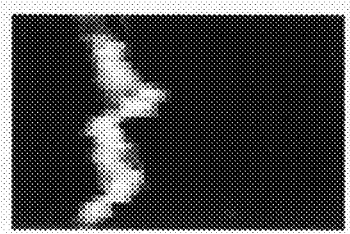
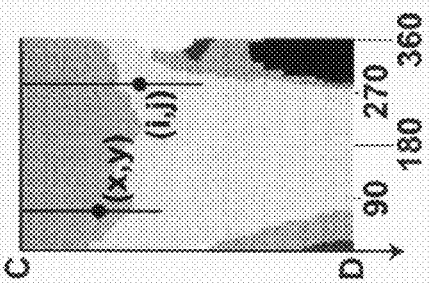
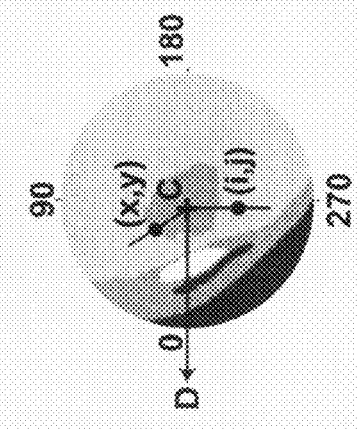

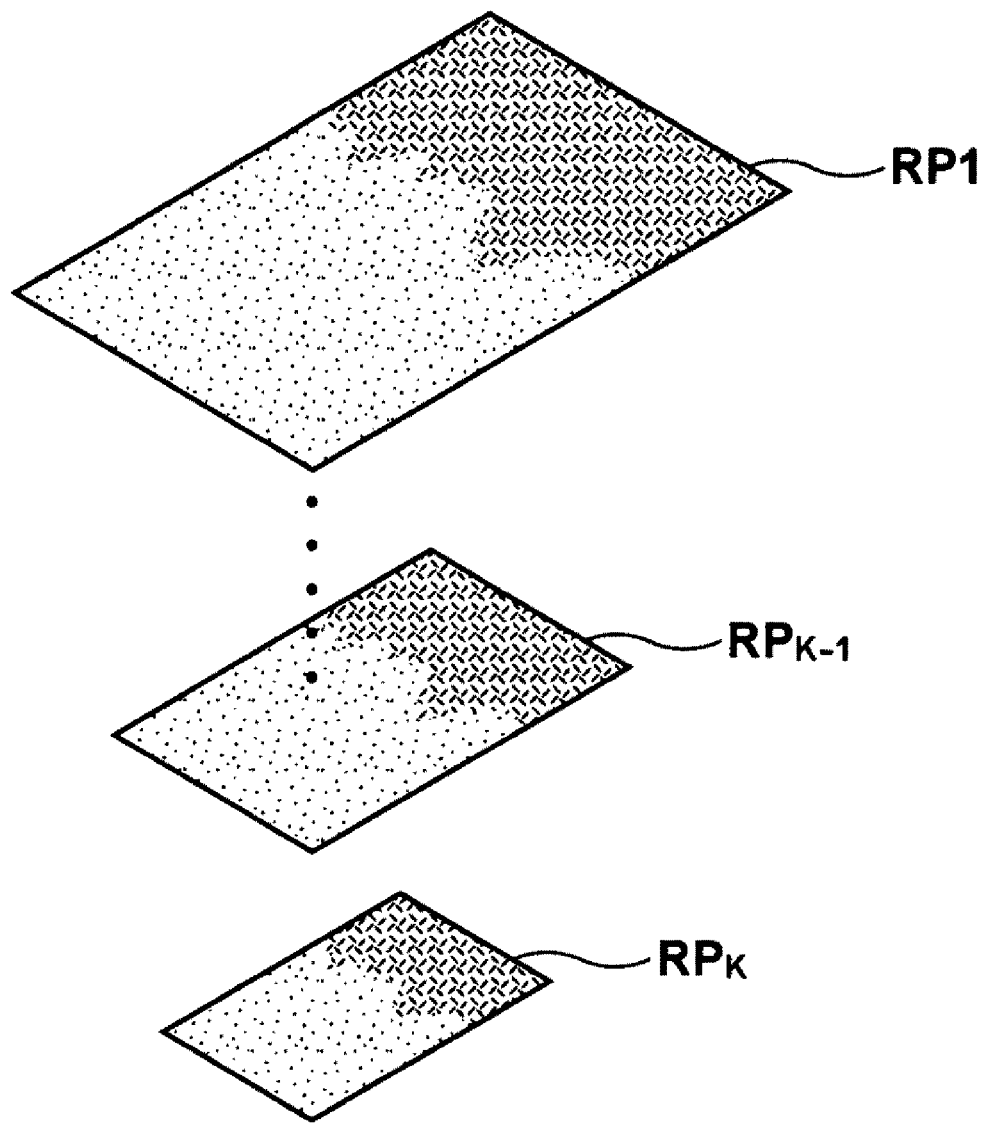

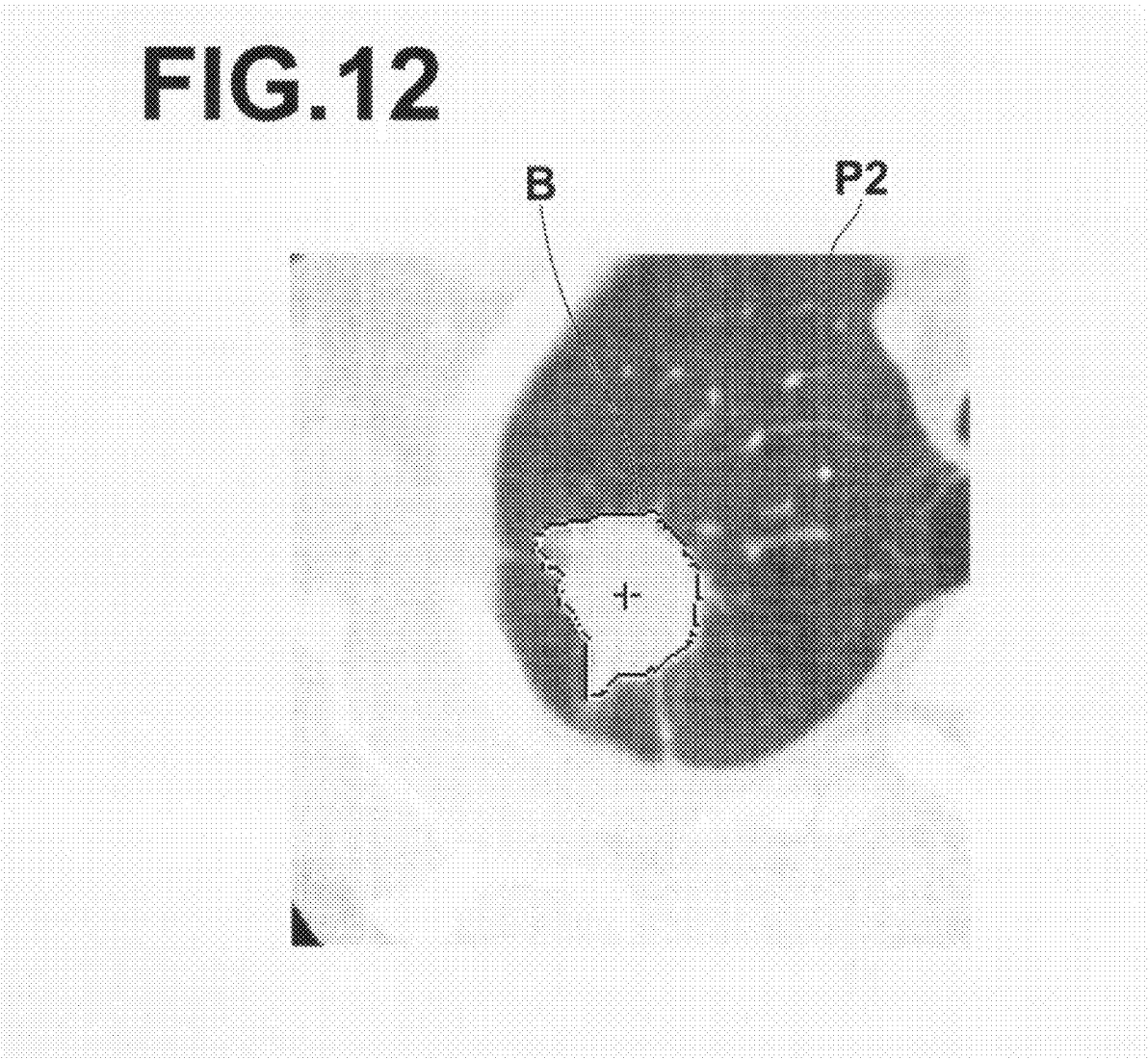

US 7,929,739 B2

IMAGE PROCESSING METHOD, APPARATUS, AND PROGRAM

BACKGROUND OF THE INVENTION

1. Field of the Invention

The present invention relates to a method, apparatus, and program for detecting a contour of a particular region in an image. More specifically, the present invention relates to an image processing method, apparatus, and program for detecting a contour of a tumor area in a medical image.

2. Description of the Related Art

In the medical field, computer aided diagnosis (CAD), in which an image analysis is performed on a digital medical image (hereinafter, simply referred to as "medical image") for diagnosis, is used in order to improve diagnostic accuracy and to reduce the burden on the medical staff, including doctors, who performs radiological image reading.

One of the known CAD systems, for example, automatically analyzes a malignancy grade of a tumor based on radiological information, such as the size of a lesion in a medical image. U.S. Pat. No. 6,738,499 (Patent Document 1) proposes a method in which an approximate contour of a tumor is manually set by a radiological doctor, and the likelihood of malignancy of the tumor is automatically analyzed by an artificial neural network (ANN) method based on radiological characteristic amounts of the tumor, such as, for example, the size of the tumor, distribution of CT values inside of the tumor, and the like, obtained by the contour.

For performing medical diagnosis based on such radiological information of a tumor area, it is necessary to accurately detect a tumor area or the contour thereof in a chest CT image. As one of the methods for detecting tumor areas, the following method is known as described, for example, in Japanese Unexamined Patent Publication No. 2003-250794 (Patent Document 2). That is, the method includes the steps of: extracting vessel candidate regions in a plurality of sequential CT images through binarization process; selecting a region with a circumscribed rectangular solid having a greater volume from the vessel candidate regions as the vessel region; performing an erosion process and selecting isolated regions on the vessel region as tumor candidate regions; and detecting a tumor candidate region having a substantially spherical shape as a tumor area.

Further, a non-patent literature, "Robust Anisotropic Gaussian Fitting for Volumetric Characterization of Pulmonary Nodules in Multislice CT" by K. Okada et al., IEEE Transactions on Medical Imaging, Vol. 24, No. 3, pp. 409-423, 2005, (Non-patent Document 1) proposes a method in which the intensity distribution of a tumor area is assumed to be Gaussian distribution, and the average and variance of an anisotropic Gaussian distribution corresponding the most to the intensity distribution of the tumor area are calculated, and an elliptical contour centered on the position of the median value of the Gaussian distribution is obtained.

Still further, U.S. Pat. No. 6,973,212 (Patent Document 3) discloses a method in which a target region in an image specified by a user is extracted using likelihood that each pixel is a pixel representing the target area or background area calculated based on information regarding a particular pixel representing the target region and a particular pixel representing the background area, and likelihood that adjacent pixels are pixels of the same region calculated based on local contrast of the image (edge information), and the contour of the extracted target region is obtained.

Further, a non-patent literature, "A new 2D segmentation method based on dynamic programming applied to computer aided detection in mammography" by S. Timp and N. Karssemeijer, Med. Phys. Vol. 31, No. 5, 2004 (Non-patent Document 2) describes a method in which an evaluation value, which indicates whether or not each pixel in an image is a pixel representing the contour of a tumor area, is obtained using local contrast in the image (edge information), expected size of the tumor area, and intensity distribution of the image, and an optimum contour path obtained through dynamic programming based on the obtained evaluation value is determined as the contour of the tumor area.

In liver cancer diagnosis using CT images, however, the contrast between a tumor and background liver tissue is smaller in comparison with image diagnosis for lung cancer and breast cancer, and tumors have variety of shapes. Thus, the method proposed in Patent Document 2, in which a tumor area is determined from the regions extracted through binarization process, may not correctly detect tumor areas in many occasions. FIGS. 2A to 2D and FIGS. 3A to 3D illustrate one-dimensional intensity profiles on straight lines passing through liver tumors. Here, "A" and "A'" denote a contour portion of a tumor. For example, in FIG. 2B representing a one-dimensional intensity profile on the straight line A-A' of FIG. 2A, the contrast between the tumor and background liver tissue is great, so that the tumor area may be detected through binarization process using an appropriate threshold value. However, in FIGS. 2D, 3B, and 3D, the distinction between the inside and outside of the tumor may not be made only by the intensity, so that detection of the tumor area through binarization process is difficult.

The method for obtaining a contour of a target region based on the local contrast (edge information) of an image disclosed in Patent Document 3 or Non-patent Document 2 has a problem that the contour extraction is susceptible to changes in local contrast, and as the contrast between the target region and background area becomes small, the contour detection capability is degraded.

Further, the method proposed in Non-patent Document 1, which performs contour detection on the assumption that the intensity distribution of a tumor follows Gaussian distribution, may not be applied to the case in which the inside of the tumor has a lower intensity value, with low intensity variation, than the background tissue as illustrated in FIG. 3B, and the case in which the intensity distribution may not be approximated by Gaussian distribution due to, for example, the presence of a plurality of Gaussian intensity distributions inside and outside of the tumor as illustrated in FIG. 3D, and the like. Further, the contour is obtained as an ellipse, so that an accurate contour may not be obtained for a tumor having an irregular shape, thereby the accuracy of the image diagnosis may be degraded.

SUMMARY OF THE INVENTION

The present invention has been developed in view of the circumstances described above, and it is an object of the present invention to provide an image processing method, apparatus, and program capable of enhancing detection capabilities for tumor contours.

It is a further object of the present invention to provide an image processing method, apparatus, and program capable of enhancing detection capabilities in contour detection of particular regions of different types of images to which the technology of the present invention is generally applicable.

The image processing method of the present invention is an image processing method for determining a contour of a particular region in an input image, including the steps of:

performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;

setting an arbitrary point within the particular region in the input image;

setting a discrimination region in the input image, which includes the particular region, with reference to the determined arbitrary point;

obtaining a characteristic amount of each pixel within the determined discrimination region;

calculating, using the evaluation function, an evaluation value that indicates whether or not each pixel within the discrimination region is a pixel representing the contour based on the obtained characteristic amount thereof; and determining the contour using the calculated evaluation value.

The image processing apparatus of the present invention is an apparatus for determining a contour of a particular region in an input image, including:

an evaluation function obtaining means for performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;

a point setting means for setting an arbitrary point within the particular region in the input image;

a region setting means for setting a discrimination region in the input image, which includes the particular region, with reference to the determined arbitrary point;

a characteristic amount obtaining means for obtaining a characteristic amount of each pixel within the determined discrimination region;

an evaluation value calculation means for calculating, using the evaluation function, an evaluation value that indicates whether or not each pixel within the discrimination region is a pixel representing the contour based on the obtained characteristic amount thereof; and a contour determination means for determining the contour using the calculated evaluation value.

The image processing program of the present invention is a program for causing a computer to execute an image processing method for determining a contour of a particular region in an input image, the method including the steps of:

performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;

setting an arbitrary point within the particular region in the input image;

setting a discrimination region in the input image, which includes the particular region, with reference to the determined arbitrary point;

obtaining a characteristic amount of each pixel within the determined discrimination region;

calculating, using the evaluation function, an evaluation value that indicates whether or not each pixel within the discrimination region is a pixel representing the contour based on the obtained characteristic amount thereof; and determining the contour using the calculated evaluation value.

The characteristic amount may be intensity information within an adjacent region of a target pixel from which the characteristic amount is to be obtained. Here, the adjacent region may be a square region.

Further, the characteristic amount may be intensity information within a one-dimensional intensity profile extending from a target pixel from which the characteristic amount is to be obtained to an arbitrary direction within the discrimination region.

Still further, the characteristic amount may be intensity information within a one-dimensional intensity profile that combines a one-dimensional intensity profile extending from the arbitrary point to the direction passing through a target pixel from which the characteristic amount is to be obtained with a one-dimensional intensity profile extending from the arbitrary point to another direction.

Still further, the evaluation function may be a function capable of evaluating whether or not each pixel is a pixel representing the contour using discrimination results provided by a plurality of weak classifiers that evaluates whether or not each pixel is a pixel representing the contour.

The image processing apparatus described above may further includes a multi-resolution image obtaining means for obtaining a plurality of images having different resolutions by multi-resolutioning an image within the discrimination region, and the characteristic amount obtaining means and the evaluation value calculation means may be means for obtaining the characteristic amount and calculating the evaluation value for each of the plurality of images respectively.

Further, the image processing apparatus described above may further includes a coordinate transformation means for transforming an image within the discrimination region from an image represented in a rectangular coordinate system into an image represented in a polar coordinate system with respect to the arbitrary point, and the characteristic amount obtaining means may be a means for obtaining the characteristic amount using the image within the discrimination region coordinate-transformed and represented in the polar coordinate system.

Still further, the contour determination means may be a means for determining the contour using a graph cuts algorithm or a dynamic programming method.

The referent of "particular region in an input image" as used herein means an area which should not normally present in any type of image, such as a diseased area of a medical image indicating a brain tumor, chest knot, hepatic tumor, liver cyst, or kidney cyst, a freckle in a skin image, or a flaw in an industrial product image.

The referent of "obtaining an evaluation function" as used herein means not only obtaining the evaluation function in advance but also obtaining as required.

According to the image processing method, apparatus, and program of the present invention, a discrimination region that includes a particular region is determined within an input image with reference to an arbitrary point determined within the particular region, an evaluation value that indicates whether or not each pixel within the determined discrimination region is a pixel representing the contour of the particular region is calculated based on the characteristic amount of each pixel within the determined discrimination region using an evaluation function, and the contour of the particular region is determined using the calculated evaluation value. In particular, an evaluation function obtained by performing machine learning in advance for learning a characteristic amount of each pixel in a plurality of sample images, each including a particular region with a known contour, and is capable of evaluating whether or not each pixel is a pixel representing the contour based on the characteristic amount thereof is used as the evaluation function, so that contours of particular regions in input images may be accurately and automatically detected even if the particular regions have complicated density distributions, irregular shapes, or small contrast with respect to the background.

Here, if the characteristic amount is intensity information within a one-dimensional intensity profile that combines a one-dimensional intensity profile extending from the arbitrary point to the direction passing through a target pixel from which the characteristic amount is to be obtained with a one-dimensional intensity profile extending from the arbitrary point to another direction, two-dimensional evaluation is possible using the combined one-dimensional intensity profile, thereby more reliable evaluation is possible.

Further, if the evaluation function is a function capable of evaluating whether or not each pixel is a pixel representing the contour using discrimination results provided by a plurality of weak classifiers that evaluates whether or not each pixel is a pixel representing the contour, high robust evaluation is possible.

Still further, if the apparatus further includes a multi-resolution image obtaining means for obtaining a plurality of images having different resolutions by multi-resolutioning an image within the discrimination region, and the characteristic amount obtaining means and the evaluation value calculation means are means for extracting the characteristic amount and calculating the evaluation value for each of the plurality of images respectively, evaluation values for particular regions having various sizes may be calculated accurately.

Further, if the apparatus includes a coordinate transformation means for transforming an image within the discrimination region from an image represented in a rectangular coordinate system into an image represented in a polar coordinate system with respect to the arbitrary point, and if the characteristic amount obtaining means is a means for obtaining the characteristic amount using the image within the discrimination region coordinate-transformed and represented in the polar coordinate system, the amount of calculation may be reduced drastically.

BRIEF DESCRIPTION OF THE DRAWINGS

FIG. 4 is a block diagram illustrating an example evaluation function obtained by the evaluation function obtaining section shown in FIG. 1.

FIG. 7A to 7E illustrate example image processing according to the image processing method of the present invention.

FIG. 8 illustrates example multi-resolution images obtained by the multi-resolution image obtaining section shown in FIG. 1.

FIG. 12 illustrates an example contour determined by the image processing apparatus of the present invention.

DESCRIPTION OF THE PREFERRED EMBODIMENTS

Figure 1:
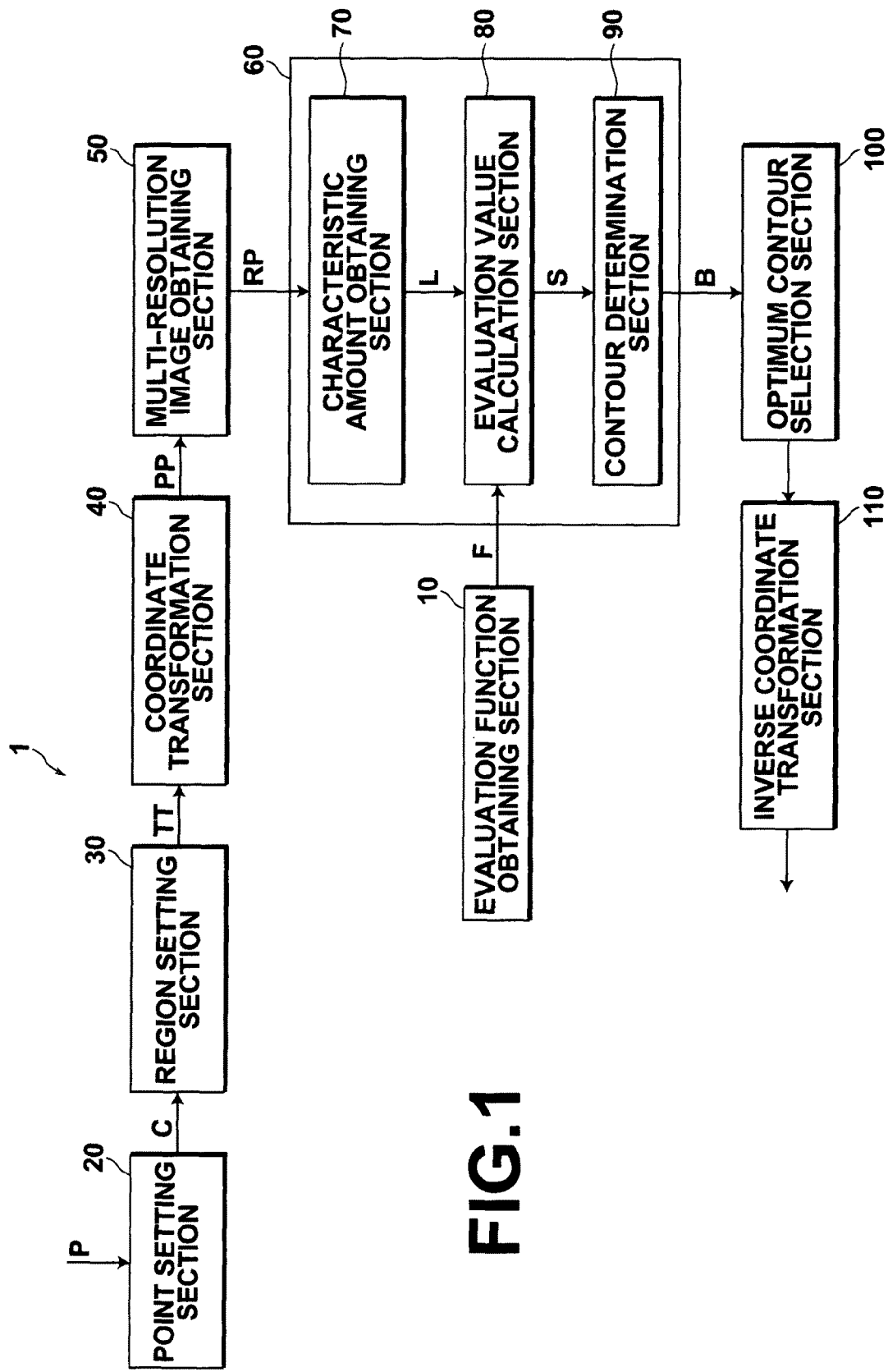
FIG. 1 is a block diagram of a first embodiment of the image processing apparatus of the present invention.
Figure 2A:
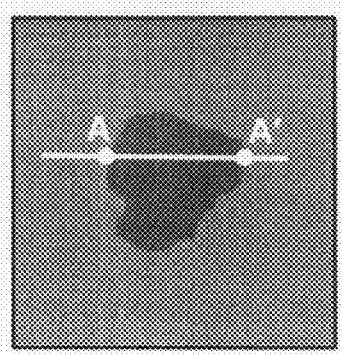
FIGS. 2A to 2D illustrate one-dimensional intensity profiles on a straight line passing through a liver tumor.
Figure 2B:
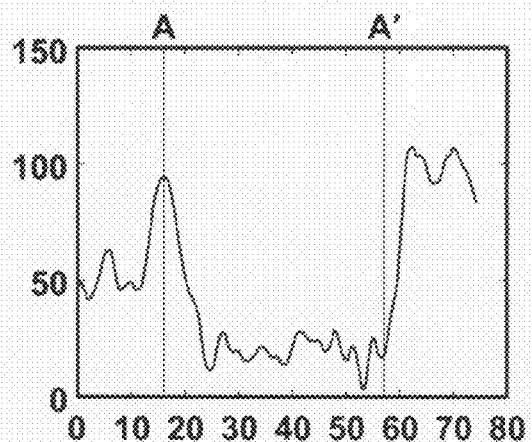
Figure 2C:
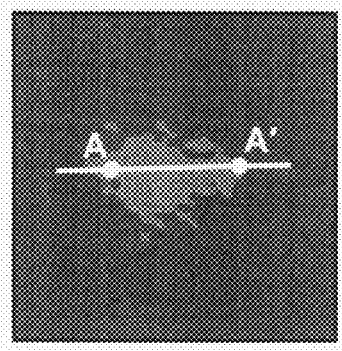
Figure 2D:
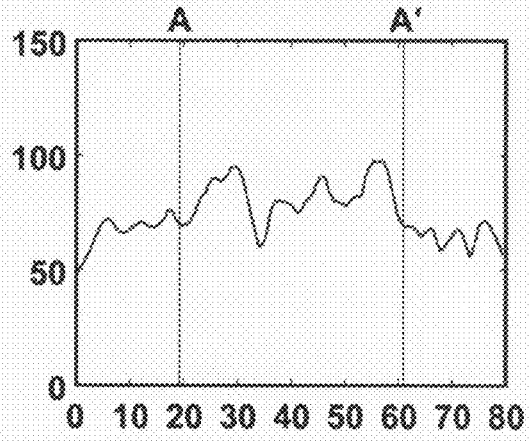
Figure 3A:
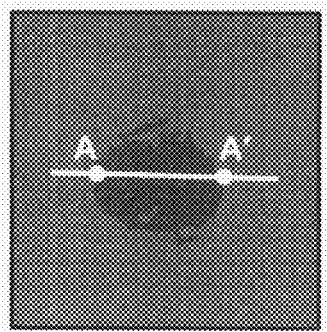
FIGS. 3A to 3D illustrate a one-dimensional intensity profile on a straight line passing through a liver tumor.
Figure 3B:
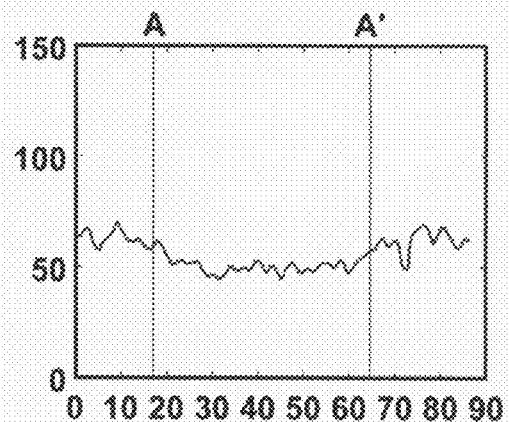
Figure 3C:
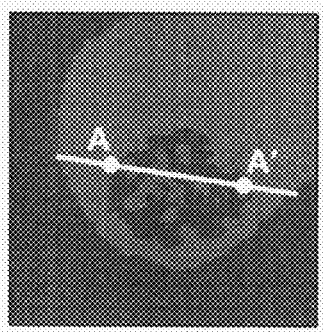
Figure 3D:
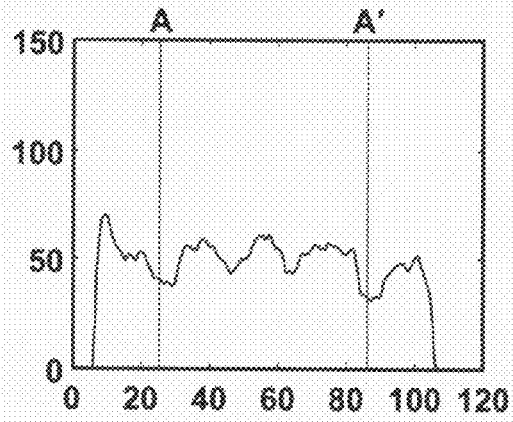

Hereinafter, a first embodiment of the image processing apparatus of the present invention in which the apparatus is applied to determining a contour of a tumor area in a medical image, will be described with reference to the accompanying drawings. The configuration of an image processing apparatus 1 illustrated in FIG. 1 is realized by executing an image processing apparatus program, which is stored in an auxiliary storage, on a computer (e.g., personal computer, or the like). The program for realizing the image processing apparatus is recorded on an information recording medium, such as a CD-ROM, or distributed through a network, such as the Internet, and installed on the computer.

The image processing apparatus 1 is an apparatus for determining a contour of a tumor area in a medical image P obtained by a CT system or the like. As illustrated in FIG. 1, the image processing apparatus 1 includes: an evaluation function obtaining section 10 for performing machine learning in advance for learning a characteristic amount of each pixel in a plurality of sample images, each including a tumor area with a known contour, and obtaining an evaluation function F capable of evaluating whether or not each pixel is a pixel representing the contour based on the characteristic amount thereof; a point setting section 20 for setting an arbitrary point C within the tumor area in the medical image P; a region setting section 30 for setting a discrimination region TT in the medical image P, which includes the tumor area, with reference to the point C; a coordinate transformation section 40 for transforming an image within the determined discrimination region TT from an image represented in a rectangular coordinate system into an image PP represented in a polar coordinate system with respect to the point C; a multi-resolution image obtaining section 50 for obtaining a plurality of images RP having different resolutions by multi-resolutioning the coordinate transformed image PP; a contour obtaining section 60 for obtaining a contour B of the tumor from each of the plurality of multi-resolution images; an optimum contour selection section 100 for selecting an optimum contour BB from the contour B obtained from each of the plurality of images RP; and an inverse coordinate transformation section 110 for inverse transforming the image represented in polar coordinate system that includes information of the selected optimum contour BB into an image represented in rectangular coordinate system with respect to the selected point C.

Here, the contour obtaining section 60 includes: a characteristic amount obtaining section 70 for obtaining a characteristic amount L of each pixel within the plurality of images RP; an evaluation value calculation section 80 for calculating, using the evaluation function F, an evaluation value S that indicates whether or not each pixel within each image RP is a pixel representing the contour based on the obtained characteristic amount L; and a contour determination section 90 for determining the contour B of the tumor area in each image RP based on the calculated evaluation value S.

The evaluation function obtaining section 10 has a capability to perform machine learning, such as Adaboosting algorithm, in advance for learning a characteristic amount of each pixel in a plurality of sample images, each including a tumor area with a known contour, and to obtain an evaluation function F capable of evaluating whether or not each pixel is a pixel representing the contour based on the characteristic amount thereof. The function F obtained by the evaluation function obtaining section 10 may be applied to evaluate whether or not each pixel within a medical image is a pixel representing the contour of a tumor area in the medical image.

An example method for obtaining the evaluation function F will now be described in detail. Learning samples (x1, y1)...(xN, yN), each correctly identified in advance whether it is a positive sample or a negative sample, are provided first from medical images, each including a tumor area with a known contour. Here, xi denotes the data of the learning samples, i.e., a one-dimensional intensity profile having a certain fixed length (e.g., 32 pixels) in the present embodiment. yi denotes labels of the learning samples: yi=−1 indicates that the learning sample is labeled as a positive sample, and yi=−1 indicates that the learning sample is labeled as a negative sample.

For example, among one-dimensional intensity profiles having certain lengths passing through tumors as illustrated in FIGS. 2A to 2D, a one-dimensional intensity profile having a contour portion within a certain range from each end is extracted as a positive sample. Other one-dimensional intensity profiles, such as profiles that include only a single contour portion, profiles of inside of tumors or of background tissue which do not include a contour portion, are extracted as negative samples.

Figure 5A:
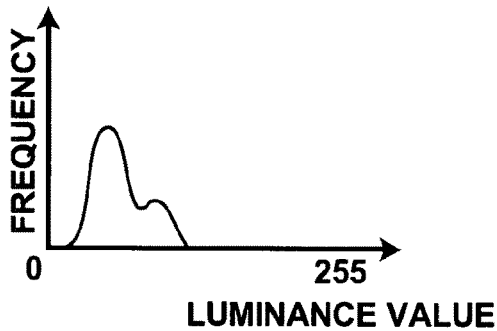
FIG. 5A illustrates a histogram of intensity values within a one-dimensional intensity profile prior to normalization.
Figure 5B:
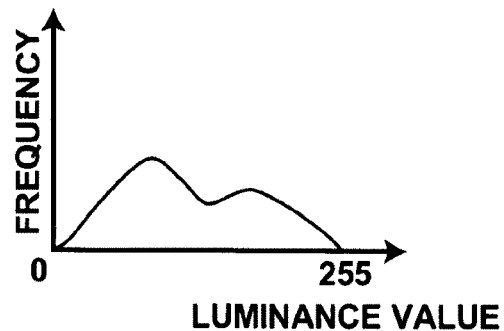
FIG. 5B illustrates a histogram of intensity values after normalization.

Further, normalization is performed on the extracted one-dimensional intensity profiles to align the contrast at a predetermined level. For example, in the case that the magnitudes of the intensity values of the one-dimensional intensity profiles are concentrated at the low value side, as illustrated in FIG. 5A, the normalization is performed such that the magnitudes are distributed across the entire range from 0 through 255, as illustrated in FIG. 5B.

Figure 5C:
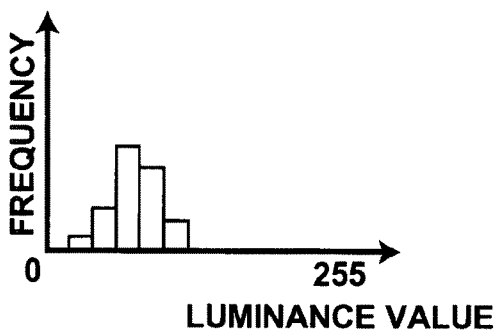
FIG. 5C illustrates a histogram of quinarized intensity values.
Figure 5D:
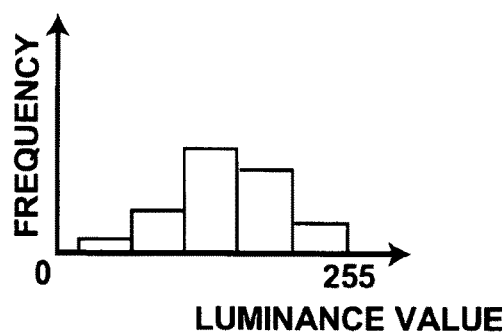
FIG. 5D illustrates a histogram of quinarized intensity values after normalization.

Note that, it is preferable that the distribution range of one-dimensional intensity profile in a histogram be divided, for example, into five, as illustrated in FIG. 5C, in order to reduce the amount of information effectively. Then, the one-dimensional intensity profile is normalized by redistributing the histogram such that the frequency distribution, divided into five, is distributed across the entire range of values from 0 through 255, as illustrated in FIG. 5D.

The evaluation function F, obtained through Adaboosting algorithm, includes a plurality of weak classifiers $f_1$ to $f_M$ (M: number of weak classifiers), as illustrated in FIG. 4. Each of the weak classifiers $f_1$ to $f_M$ is capable of discriminating whether or not each learning sample is a positive sample using the data of learning samples, i.e., using the characteristic amount L, which is based on the intensity information within the one-dimensional intensity profile.

Figure 6:
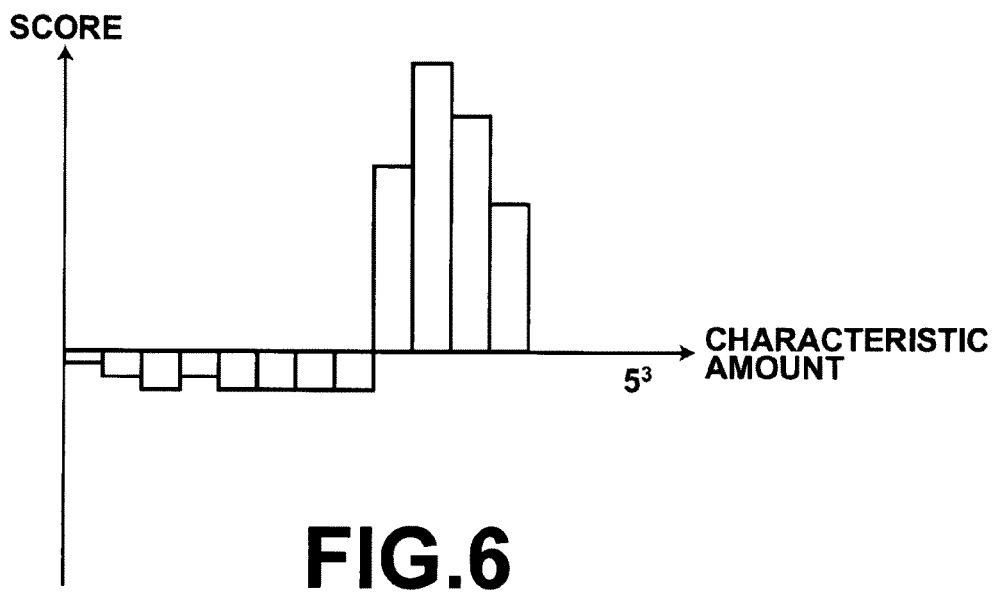
FIG. 6 is a graph illustrating an example histogram of a weak classifier shown in FIG. 4.

Each of the weak classifiers $f_1$ to $f_M$ has a histogram, as illustrated in FIG. 6, and based on the histogram, it outputs a discrimination result according to the value of the characteristic amount L, which is based on the intensity information within the one-dimensional profile.

In the present embodiment, combinations of intensity values of three different pixels within a one-dimensional intensity profile after normalization are used as the characteristic amount L. Each of the weak classifiers uses combinations of intensity values of a different set of three different pixels with each other. For example, an arrangement may be made such that the weak classifier $f_1$ uses combinations of intensity values of three pixels from the left end of the one-dimensional intensity profile as the characteristic amount L, while the weak classifier $f_2$ uses combinations of intensity values of three pixels in every other location from the left end of the one-dimensional intensity profile as the characteristic amount L, and so on.

Note that the description is made here of a case in which each of the weak discriminators $f_1$ to $f_M$ uses combinations of intensity values of a different set of three different pixels with each other as the characteristic amount L, but information related to the difference in intensity values, contrast, edges may also be used.

Next, a method for generating the evaluation function F by successively generating a plurality of weak classifiers $f_m$ according to Adaboosting algorithm will be described.

First, the value of weighting $W^1$ (i) is set equally across the learning samples, and an error rate J of the evaluation function F for the weighted learning samples is calculated by Formula 1 below.

$$J(F(x)) = \sum_i e^{-y_i F(x)_i} \quad (1)$$

Here, in order to enhance the evaluation performance of an evaluation function $F_{M-1} = \sum_{m=1}^{M-1} f_m(x)$ formed of M−1 weak classifiers, a new weak classifier $f_M$ for minimizing the error rate J indicated by Formula (1) above is generated by Formula (2) below to generate an evaluation function $F_M = \sum_{m=1}^{M} f_m(x)$. In Formula (2) below, the probability density $P_m(x)$ indicates percentages of correct discriminations of positive samples (y=1) or negative samples (y=−1) to all of the learning samples, based on the value of weighting $W^{M-1}$ of the learning samples.

$$f_M(x) = \frac{1}{2} \ln \left( \frac{Pm(y = +1 \mid x, w^{M-1})}{Pm(y = -1 \mid x, w^{M-1})} \right) \quad (2)$$

Next, the value of weighting $W^M$ of each learning sample for the $M^{th}$ repetitive processing using the weak classifier $f_m$ is renewed by Formula (3) below.

$$W^M = W^{M-1} e^{-y_i f_M(x)} \quad (3)$$

Then, repeating the generation of a weak classifier until the final evaluation function $F_M$, which combines all of the weak classifiers generated after repeating the process for a predetermined number of times (=T times), has desired discrimination performance for the learning data sets.

The final evaluation function $F_M$ may evaluate whether or not a learning sample is a positive sample, i.e., a one-dimensional intensity profile having a contour portion in each of two positions within certain ranges by discriminating the sign of the sum of the discrimination results of all of the weak classifiers, i.e., by discriminating whether the evaluation function $F_M$ shown in Formula (4) below is positive or negative.

$$F(x) = \text{sgn}\left(\sum_{m=1}^{M} f_m(x)\right) \quad (4)$$

Here, the description is made of a case in which the evaluation function obtaining section 10 obtains the evaluation function F through Adaboosting algorithm. Alternatively, other machine learning algorithms, such as neural network, SVM (support vector machine) may be employed.

The point setting section 20 sets an arbitrary point within a tumor area in a medical image P obtained by a CT system or the like. The point setting section 20 may be a section for setting a point specified through a keyboard or a pointing device of the image processing apparatus 1 as an arbitrary point Ps, or it may be a section for setting a point at the barycentric position of a tumor area automatically detected by the method described in Japanese Unexamined Patent Publication No. 2003-250794 or the like as the arbitrary point C. Here, the arbitrary point C may be determined at the approximate center of a tumor area, or it may be determined at a position away from the center of the tumor.

The region setting section 30 sets the discrimination region TT that includes the tumor area in the medical image P centered on the arbitrary point C set by the point setting section 20, as illustrated in FIG. 7A. More specifically, a region of a predetermined radius including the tumor area centered on the arbitrary point C is determined as the discrimination region TT. This limitation of region of interest from the entire image P allows the subsequent processing to be performed rapidly.

The discrimination region TT may have any shape as the circumferential shape, such as a rectangle, circle, ellipsoid, or the like.

The coordinate transformation section 40 has a capability to transform an image within the discrimination region TT set by the region setting section 30 from an image represented in a rectangular coordinate system into an image PP represented in a polar coordinate system represented by the distance from the arbitrary point C, and the angle θ formed with a predetermined straight line passing through the arbitrary point C. For example, the image illustrated in FIG. 7B is an image represented in polar coordinate system represented by the distance from the point C and the angle θ in the clockwise direction with reference to a predetermined line segment C-D in the radial direction from the point C obtained by transforming the image represented in rectangular coordinate system shown in FIG. 7A. This allows each pixel within the discrimination region to be readily processed through a simple search process of translation, so that the amount of calculation may be reduced drastically.

The multi-resolution image obtaining section 50 has a capability to obtain a plurality of images $RP_1$ to $RP_K$ having different resolutions by multi-resolutioning the image PP transformed by the coordinate transformation section 40, as illustrated in FIG. 8. The size of a tumor area may not fall into an evaluation range acceptable by the evaluation function F, since the evaluation function F is obtained according to one-dimensional intensity profile having a predetermined length. But, even in such a case, the size of the tumor may fall within the evaluation range of the evaluation function F on a lower or higher resolution image, so that the detection of the contour may be securely performed for tumor areas of various sizes.

In the present embodiment, the description is made of a case in which an evaluation function obtained according to the one-dimensional intensity profile having a certain fixed length (number of pixels) is used for a plurality of images having different resolutions. Alternatively, by using evaluation functions obtained according to one-dimensional intensity profiles having different lengths (number of pixels) for an image of a single resolution, contours may be detected from tumor areas of different sizes.

The contour obtaining section 60 is a section for obtaining contours $B_1$ to $B_k$ of the respective tumors from a plurality of multi-resolution images $RP_1$ to $RP_k$ obtained by the multi-resolution image obtaining section 50. The contour obtaining section 60 includes: a characteristic amount obtaining section 70 for obtaining a characteristic amount L of each pixel within a plurality of images $RP_1$ to $RP_k$ an evaluation value calculation section 80 for calculating, using the evaluation function F, an evaluation value S that indicates whether or not each pixel within each image RP is a pixel representing a contour based on the extracted characteristic amount L; and a contour determination section 90 for determining a contour B of the tumor area in each image based on the calculated evaluation value S.

The characteristic amount extraction section 70 is a section for obtaining a characteristic amount from each pixel within images $RP_1$ to $RP_k$. As illustrated in FIG. 7A or 7B, a one dimensional intensity profile that combines a one-dimensional intensity profile extending in the direction passing through the pixel (x, y) from the arbitrary point C, and a one-dimensional intensity profile extending in a direction from the point C, which is different from the direction described above and passes through arbitrary pixel (i, j), as the one-dimensional intensity profile P ((x, y), (i, j)) at pixel (x, y). Then, the length of the obtained one-dimensional intensity profile is adjusted to the length (e.g., 32 pixels) acceptable by the evaluation function F. Further, it performs the normalization and quinarization, and obtains combinations of intensity values of three different pixels within the normalized one-dimensional intensity profile, used by each of the weak classifiers $f_1$ to $f_M$ forming the evaluation function F, as the characteristic amount L at pixel (x, y).

The evaluation value calculation section 80 has a capability to calculate an evaluation value S that indicates whether or not each pixel (x, y) in the images $RP_1$ to $RP_k$ is a pixel representing a contour, based on the characteristic amount L obtained in the characteristic amount obtaining section 70. More specifically, the evaluation value calculation section 80 recognizes whether or not the sum $\Sigma_{m=1}^{M} f_m$ of each of the discrimination results obtained by each of the weak classifiers $f_1$ to $f_M$ based on the characteristic amount L constituted by combinations of intensity values of three different pixels within the one-dimensional intensity profile ((x, y), (i, j)), is greater than or equal to a predetermined threshold value (zero), as illustrated in Formula (5) below. Then, if the sum is greater than or equal to the predetermined threshold value, the sum is designated as AdaS value, and if it is smaller than the predetermined threshold value, the AdaS value is set to zero. Here, a higher likelihood that the pixel (x, y) and arbitrary pixel (i, j) are pixels corresponding to the contour portion of the tumor results in a higher AdaS value. The AdaS values are obtained for one-dimensional profile passing through the pixel (x, y) and each pixel (i, j) within the image RP excluding the pixel (x, y), and the evaluation value S of the pixel (x, y) is calculated by Formula (6) below. FIG. 7C illustrates an image in which the evaluation value S, calculated based on the characteristic amount of each pixel of the image shown in FIG. 7B, is represented as the intensity value of each pixel.

$$AdaS((x, y), (i, j)) = \begin{cases} \sum_{m=1}^{M} f(p((x, y), (i, j))) & \text{if } \sum_{m=1}^{M} f(p((x, y), (i, j))) > 0, \\ 0 & \text{else} \end{cases} \quad (5)$$

$$s(x, y) = \sum_{i=1}^{32} \max_j (AdaS((x, y), (i, j)))$$

$$i \neq x, \quad j = 1, \ldots, 36 \quad (6)$$

The contour determination section 90 has a capability to determine the contours $B_1$ to $B_k$ of the tumor areas in the images $RP_1$ to $RP_k$ based on the evaluation value S of each pixel obtained by the evaluation value calculation section 80. For example, it extracts an optimum contour path using a dynamic programming method and determines it as the contour B. More specifically, optimum solution is obtained by repeating the operation in which a range is set such that y coordinate of the next contour point following an arbitrary contour point is selected within two pixels above and below the y coordinate of the arbitrary contour point, and an optimum point (pixel with a maximum total evaluation value) among the candidate pixels within the range is determined as the next contour point, as illustrated in Formula (7) below, thereby the optimum contour B having certain continuity is extracted.

$$Su(0, y) = s(0, y) \quad (7)$$

$$Su(x + 1, y) = \max_{-2 \leq k \leq 2} Su(x, y + k) + s(x + 1, y)$$

Here, the description is made of a case in which the contour is determined using a dynamic programming method. Alternatively, the contour may be determined using other methods, including graph cuts algorithm to be described later.

The optimum contour selection section 100 obtains the total of the evaluation values S on each of the contours $B_1$ to $B_K$ of the tumor obtained from each of a plurality of multi-resolution images RP, and selects a contour having a maximum total as the optimum contour.

The inverse coordinate transformation section 110 has a capability to inverse transform the image represented in polar coordinate system with respect to the point C into an image represented in rectangular coordinate system, as an inverse transformation of the transformation performed by the coordinate transformation section 40. By inverse transforming the image represented in polar coordinate system which includes information of the optimum contour selected by the optimum contour selection section 100 into an image represented in rectangular coordinate system, the contour B may be displayed on an image within the discrimination region TT or the like on the medical image as illustrated in FIG. 7E.

Figure 9:
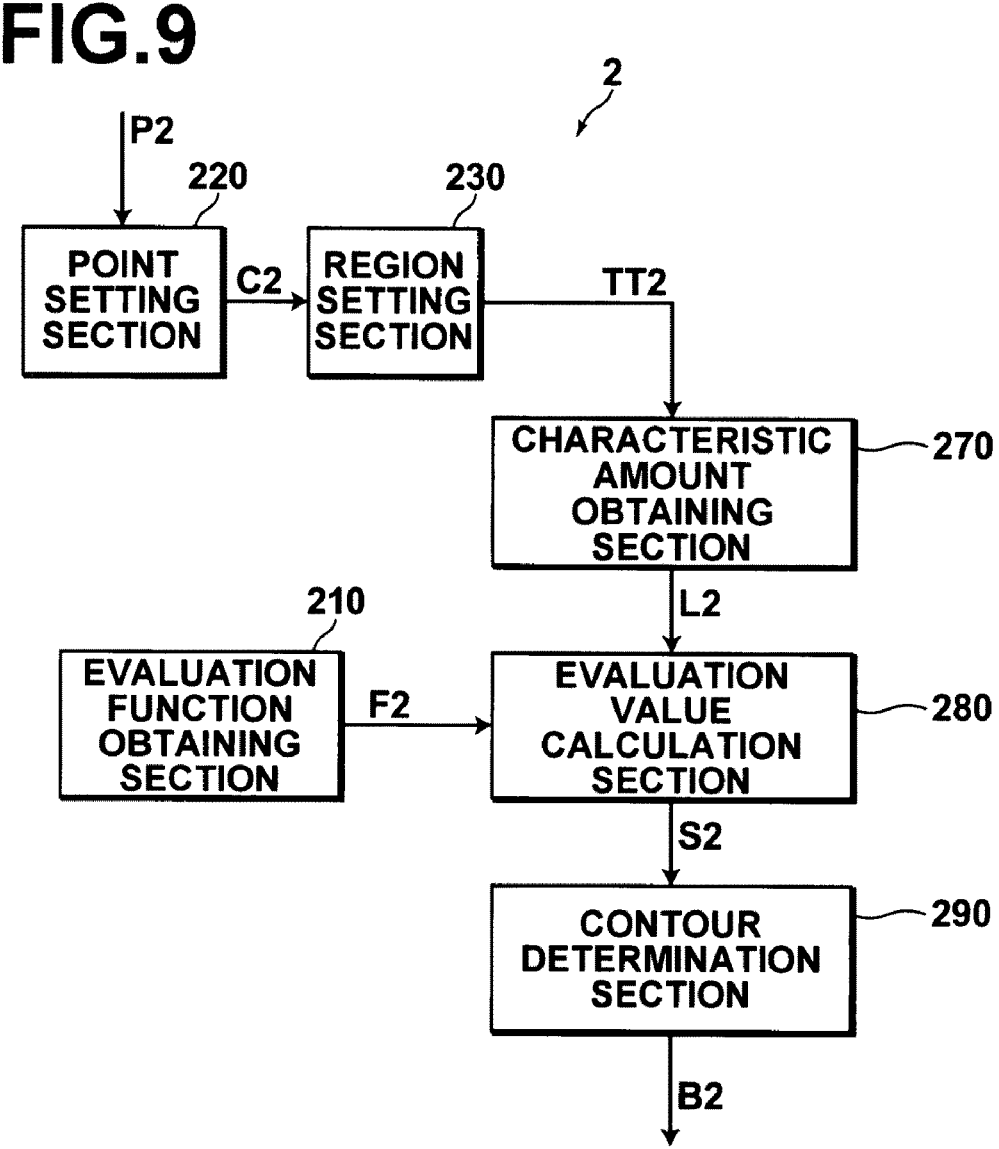
FIG. 9 is a block diagram of a second embodiment of the image processing apparatus of the present invention.

Next, a second embodiment of the image processing apparatus of the present invention in which the apparatus is applied to determining a contour of a tumor area in a medical image, will be described with reference to FIG. 9. FIG. 9 schematically illustrates the construction of an image processing apparatus 2 according to a second embodiment.

The image processing apparatus 2 is an apparatus for determining the contour of a tumor area in a medical image P2 obtained by a CT system or the like. The apparatus includes: an evaluation function obtaining section 210 for performing machine learning in advance for learning a characteristic amount of each pixel in a plurality of sample images, each including a tumor area with a known contour, and obtaining an evaluation function F2 capable of evaluating whether or not each pixel is a pixel representing the contour based on the characteristic amount thereof; a point setting section 220 for setting an arbitrary point C2 within the tumor area in the medical image P2; a region setting section 230 for setting a discrimination region TT2 in the image P2, which includes the tumor area, with reference to the point C2; a characteristic amount obtaining section 270 for obtaining a characteristic amount L2 of each pixel within the discrimination region TT2; an evaluation value calculation section 280 for calculating, using the evaluation function F2, an evaluation value S2 that indicates whether or not each pixel within the discrimination region TT2 is a pixel representing the contour based on the obtained characteristic amount L2; and a contour determination section 290 for determining the contour B2 using the calculated evaluation value S2.

The evaluation function obtaining section 210 is a section for performing machine learning, such as Adaboosting algorithm neural network, or SVM, in advance for learning a characteristic amount of each pixel in a plurality of sample images, each including a tumor area with a known contour, and obtaining an evaluation function F2 capable of evaluating whether or not each pixel is a pixel representing the contour based on the characteristic amount thereof, as in the evaluation function obtaining section 10. The function F2 obtained by the evaluation function obtaining section 210 may be applied to evaluating whether or not each pixel in a medical image is a pixel representing the contour of a tumor area in the medical image.

In the present embodiment, intensity information within an adjacent region to each pixel in a sample image, for example, combinations of intensity values of three different pixels within a rectangular region of five pixels in horizontal and vertical directions (5 pixels×5 pixels) centered on each pixel are machine learned as the characteristic amount of each pixel, and the evaluation function F2 for evaluating whether or not each pixel described above is a pixel representing the contour of the tumor is obtained.

The point setting section 220 has an identical structure to that of the point setting section 20, and is a section for setting an arbitrary point within a tumor area in an input medical image. The point setting section 220 sets an arbitrary point C2 within the tumor area in the medical image P2.

The region setting section 230 has an identical structure to that of the region setting section 30, and is a section for setting a discrimination region in the medical image, which includes the tumor area, with reference to the determined arbitrary point. The region setting section 230 sets a discrimination region TT2 in the medical image P2, which includes the tumor area, with reference to the arbitrary point C2 set by the point setting section 220.

The characteristic amount obtaining section 270 is a section for obtaining the characteristic amount L2 of each pixel within the discrimination region TT2 set by the region setting section 230, and obtains intensity information within an adjacent region of each pixel within the discrimination region TT2, for example, combinations of intensity values of three different pixels within a rectangular region of five pixels in horizontal and vertical directions respectively (5 pixels×5 pixels) centered on each pixel is obtained as the characteristic amount of each pixel.

The evaluation value calculation section 280 is a section for calculating, using the evaluation function F2, an evaluation value S2 that indicates whether or not each pixel within the discrimination region TT2 is a pixel representing the contour, based on the characteristic amount obtained by the characteristic amount obtaining section 270.

The contour determination section 290 is a section for determining the contour B2 of the tumor area using the evaluation value S2 of each pixel obtained by the evaluation value calculation section 280. When determining the contour of a target region by a graph cuts region segmentation method which divides the target area and background area using likelihood that adjacent pixels are pixels belonging to the same region as described in "Interactive Graph Cuts for Optimal Boundary and Region Segmentation of Objects in N-D images", Proceedings of "International Conference on Computer Vision", Vancouver Canada, July 2001, Vol. 1, pp 105-112, calculating likelihood that each pixel is a pixel belonging to the same region as an adjacent pixel using evaluation value S2 of each pixel, dividing the discrimination region TT2 into the tumor area and background area based on the calculated likelihood, and determining the boundary between the tumor area and background area as the contour B2 of the tumor area.

Figure 10:
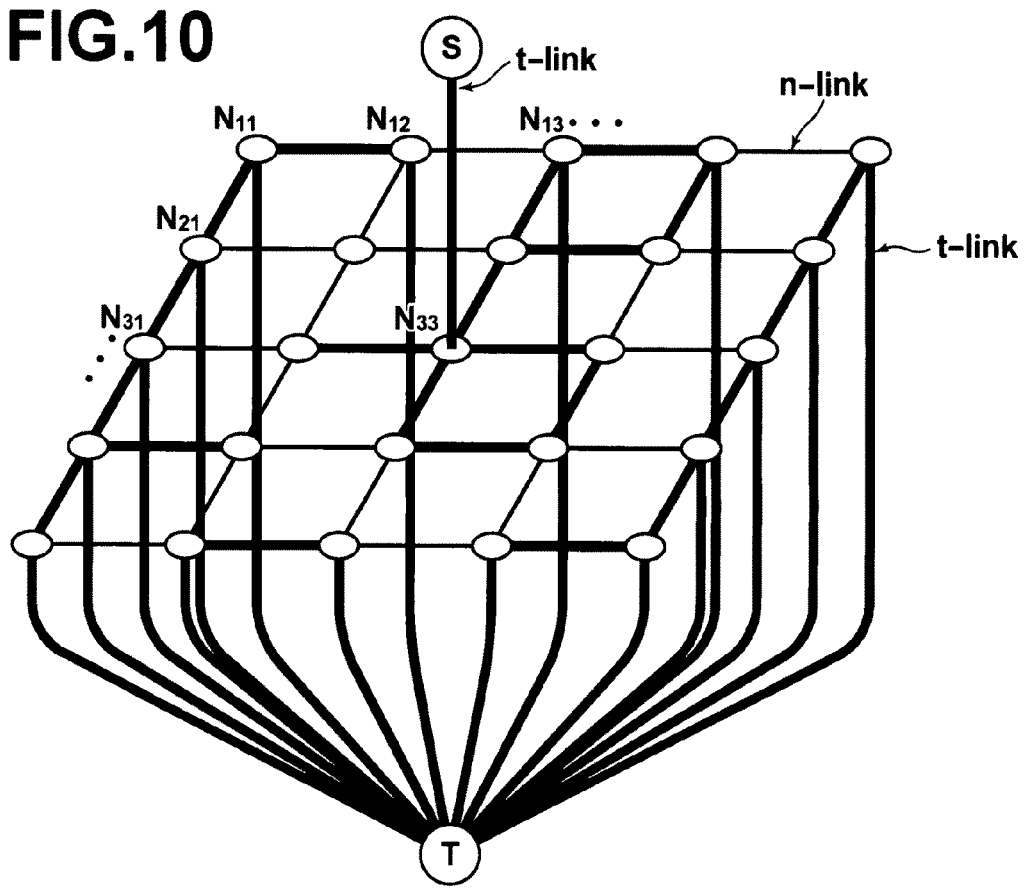
FIG. 10 illustrates an example method for determining a contour by the contour determination section shown in FIG. 9.

More specifically, as illustrated in FIG. 10, a graph including a node $N_{ij}$ representing each pixel within the discrimination region, a node S or T representing a label (tumor area or background area in the present embodiment) that each pixel may take, an n-link, which is a link connecting adjacent pixel nodes to each other, and a t-link, which is a link connecting each pixel node $N_{ij}$ to the node S representing the tumor area or to the node T representing the background area of the tumor area with each other is created.

Here, for the n-link, each node $N_{ij}$ representing each pixel within the discrimination region has four links extending to the adjacent nodes in four directions, and two links are present between two adjacent nodes, each extending from one node to the other. The four nodes extending from each node $N_{ij}$ to the adjacent nodes in four directions indicate likelihood that the pixel represented by the node is a pixel in the same region as the adjacent nodes in four directions, and the likelihood is obtained based on an evaluation value of the pixel. More specifically, if the evaluation value of the pixel represented by the node $N_{ij}$ is less than or equal to a predetermined threshold value, a predetermined maximum likelihood value is set to each of the links, while if the evaluation value is greater than or equal to the predetermined threshold value, the likelihood value is set to each of the links such that the greater the evaluation value, the smaller the likelihood value. For example, where the predetermined maximum likelihood value is 1000, if the evaluation value of the pixel represented by the node $N_{ij}$ is less than or equal to the predetermined threshold value (zero), a value of 1000 is set to each of the four links extending from the node to the adjacent nodes in four directions, while if the evaluation value is greater than or equal to the predetermined threshold value (zero), a value calculated by the formula (1000−(evaluation value S/maximum evaluation value)×1000) is set to each of the links. Here, the maximum evaluation value means a maximum value of all of the evaluation values of pixels within the discrimination region TT2 calculated by the evaluation value calculation section 280.

The t-link, connecting each node $N_{ij}$ representing each pixel to the node S representing the tumor area, represents likelihood that each pixel is a pixel included in the tumor area, and the t-link, connecting each node $N_{ij}$ representing each pixel to the node T representing the background area, represents likelihood that each pixel is a pixel included in the background area. If information indicating that each pixel is a pixel representing either the tumor area or the background area is already given, the likelihood may be determined according to the information. Where such information is not given, the likelihood may be calculated based on statistical characteristic of pixel value of one or more pixels which are known to be pixels representing the tumor area or background area.

For example, the arbitrary point C is determined on a pixel within the tumor area, so that a large likelihood value is set to the t-link connecting the node $N_{33}$, representing the arbitrary point C, to the node S, representing the tumor area, as illustrated in FIG. 10. The discrimination region TT2, determined to include the tumor area, with reference to the arbitrary point determined within the tumor area, generally includes the tumor area and the background area surrounding the tumor area. Thus, each pixel in the peripheral region may be assumed to be a pixel representing the background, and a large likelihood value is set to each of the t-links connecting each of the nodes $N_{11}, N_{12}, \ldots, N_{15}, N_{21}, N_{25}, N_{31}$ to the node T representing the background.

Figure 11:
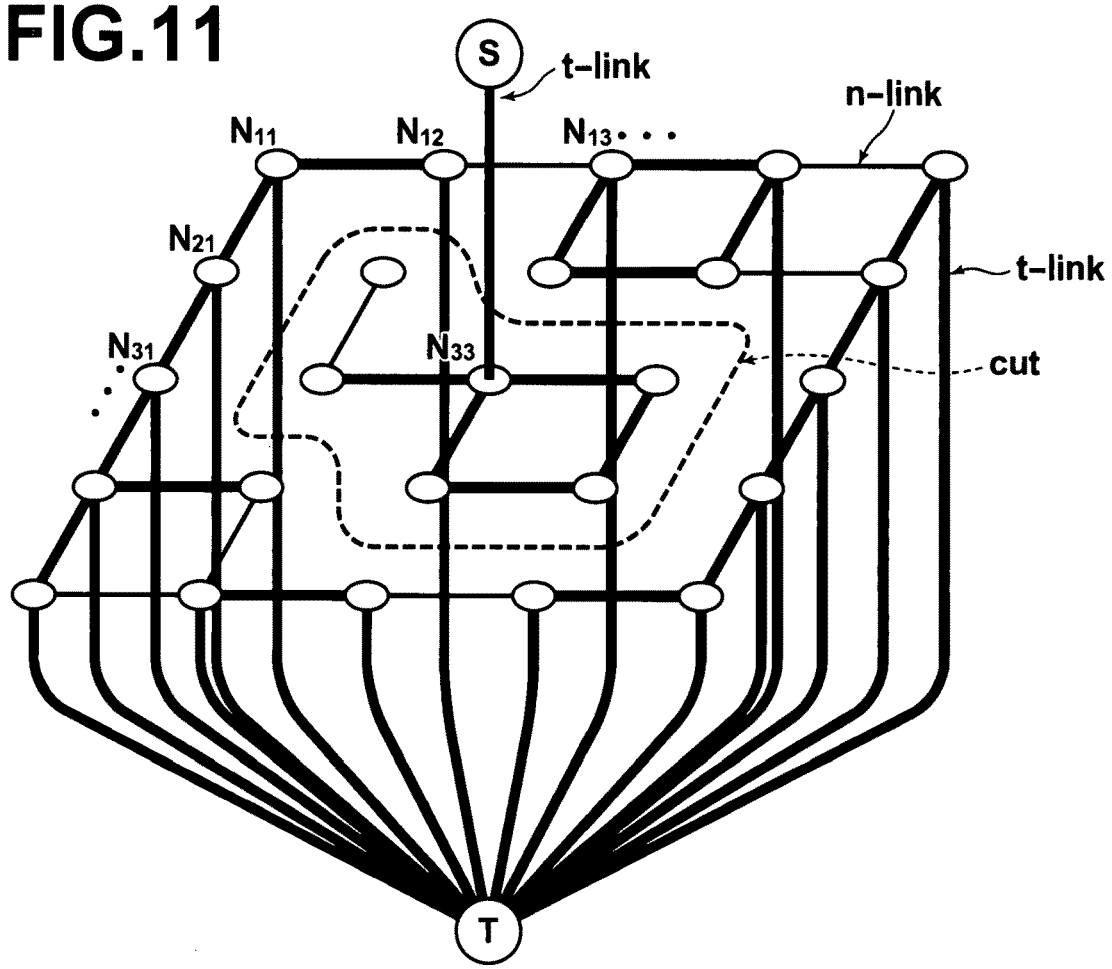
FIG. 11 illustrates an example method for determining a contour by the contour determination section shown in FIG. 9.

Then, since the tumor area and background area are exclusive regions to each other, the node S is separated from the node T by cutting appropriate links out of all of the t-links and n-links, as illustrated by a dotted line in FIG. 11, thereby the discrimination region TT2 is divided into the tumor area and the background area. The segmentation of the region may be optimized by cutting the t-links and n-links such that the total of the likelihood values of all of the t-links and n-links to be cut is minimized. FIG. 12 illustrates an example contour determined on a diseased area obtained through region segmentation performed in the manner as described above. In FIG. 12, the contour of the diseased area is indicated by a solid line.

According to the embodiments described above, machine learning for learning a characteristic amount of each pixel in a plurality of sample images, each including a tumor area with a known contour, is performed in advance to obtain an evaluation function capable of evaluating whether or not each pixel is a pixel representing the contour, an evaluation value indicating whether or not each pixel within a discrimination region, set in a medical image based on an arbitrary point set in a tumor area in the medical image, is calculated using the evaluation function based on the characteristic amount of each pixel within the discrimination region, and the contour of the tumor area in the medical image is determined. This allows contours of tumor areas to be accurately and automatically detected even if the tumor areas have complicated density distributions, irregular shapes, or small contrast with respect to the background.

Note that, in the embodiments described above, the characteristic amount may be any type of characteristic amount as long as it allows evaluation as to whether or not a target pixel, from which the characteristic amount is obtained, is a pixel representing a contour. For example, the characteristic amount may be intensity information within an adjacent region to a target pixel, or it may be intensity information within a one-dimensional intensity profile extending from a target pixel to an arbitrary direction within the discrimination region. Further, the characteristic amount may be intensity information within a one-dimensional intensity profile that combines a one-dimensional intensity profile extending from a specified arbitrary point to the direction passing through a target pixel from which the characteristic amount is to be obtained with a one-dimensional intensity profile extending from the arbitrary point to another direction.

When determining the contour of a tumor area in a three-dimensional medical image using the image processing apparatus according to the second embodiment described above, machine learning for learning a characteristic amount of each voxel in a plurality of three-dimensional sample images, each including a tumor area with a known contour, is performed by the evaluation function obtaining section 210 to obtain an evaluation function capable of evaluating whether or not each voxel is a voxel representing the contour based on the characteristic amount thereof. Here, as for the characteristic amount, intensity information of an adjacent region to a target voxel, for example, combinations of intensity values of a plurality of different voxels within a cubic region of five pixels in x, y and z axis directions centered on the target voxel may be used. Then, an arbitrary point C2 in a three-dimensional coordinate system is determined within the tumor area in the three-dimensional medical image by the point setting section 220, and a discrimination region is set in the three-dimensional medical image, which includes the tumor area, by the region setting section 230 with reference to the specified arbitrary point C2, and a characteristic amount of each voxel within the discrimination region is obtained by the characteristic amount obtaining section 270. Then, using the evaluation function F2, an evaluation value that indicates whether or not each voxel within the discrimination region is a voxel representing the contour of the tumor in the medical image is calculated by the evaluation value calculation section 280 based on the obtained characteristic amount, the discrimination region is divided into a tumor area and a background area by a graph cuts algorithm based on the calculated evaluation value, and the boundary between the tumor area and background area is determined as the contour of the tumor area.

For example, if the tumor area has such a shape that one of the straight lines extending radially from an arbitrary point within the tumor area passes through the contour two or more times, there may be a case in which the contour may not be detected correctly by a dynamic programming in which the image within the discrimination region is transformed from an image represented in a rectangular coordinate system into an image represented in a polar coordinate system with respect to the arbitrary point, and an optimum contour path is extracted by determining a single optimum contour point one after another along a predetermined forward direction across the transformed image. If that is the case, it is preferable that the discrimination region is divided into a tumor area and a background area, and the contour of the tumor area is determined by the graph cuts region segmentation algorithm.

In the aforementioned embodiments, the description is made of a case in which the image processing apparatus of the present invention is applied to determining the contour of a tumor area in a medical image. But the application of the apparatus is not limited to this, and may also be applied to detecting contours of particular regions in various input images, such as an organ region or diseased area in a medical image, a freckle in a skin image, a flaw in an industrial product image.

Further, the various measures in determining the contour of a tumor area in a medical image described above may also be applied to detecting contours of different types of areas in various input images.

What is claimed is:

1. An image processing apparatus for determining a contour of a particular region in an input image, comprising:

an evaluation function obtaining means for performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;

a point setting means for setting an arbitrary point within the particular region in the input image;

a region setting means for setting a discrimination region in the input image, which includes the particular region, with reference to the determined arbitrary point;

a characteristic amount obtaining means for obtaining a characteristic amount of each pixel within the determined discrimination region;

an evaluation value calculation means for calculating, using the evaluation function, an evaluation value that indicates whether or not each pixel within the discrimination region is a pixel representing the contour based on the obtained characteristic amount thereof; and a contour determination means for determining the contour using the calculated evaluation value, wherein the characteristic amount is combinations of intensity values of a plurality of different pixels within an adjacent region to a target pixel from which the characteristic amount is to be obtained.

2. An image processing apparatus for determining a contour of a particular region in an input image, comprising:

an evaluation function obtaining means for performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;

a point setting means for setting an arbitrary point within the particular region in the input image;

a region setting means for setting a discrimination region in the input image, which includes the particular region, with reference to the determined arbitrary point;

a characteristic amount obtaining means for obtaining a characteristic amount of each pixel within the determined discrimination region;

an evaluation value calculation means for calculating, using the evaluation function, an evaluation value that indicates whether or not each pixel within the discrimination region is a pixel representing the contour based on the obtained characteristic amount thereof; and a contour determination means for determining the contour using the calculated evaluation value, wherein the characteristic amount is intensity information within a one-dimensional intensity profile extending from a target pixel from which the characteristic amount is to be obtained to an arbitrary direction within the discrimination region.

3. An image processing apparatus for determining a contour of a particular region in an input image, comprising:

an evaluation function obtaining means for performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;

a point setting means for setting an arbitrary point within the particular region in the input image;

a region setting means for setting a discrimination region in the input image, which includes the particular region, with reference to the determined arbitrary point;

a characteristic amount obtaining means for obtaining a characteristic amount of each pixel within the determined discrimination region;

an evaluation value calculation means for calculating, using the evaluation function, an evaluation value that indicates whether or not each pixel within the discrimination region is a pixel representing the contour based on the obtained characteristic amount thereof; and a contour determination means for determining the contour using the calculated evaluation value, wherein the characteristic amount is intensity information within a one-dimensional intensity profile that combines a one-dimensional intensity profile extending from the arbitrary point to the direction passing through a target pixel from which the characteristic amount is to be obtained with a one-dimensional intensity profile extending from the arbitrary point to another direction.

4. The image processing apparatus according to claim 2, wherein the evaluation function is a function capable of evaluating whether or not each pixel is a pixel representing the contour using discrimination results provided by a plurality of weak classifiers that evaluates whether or not each pixel is a pixel representing the contour.

5. The image processing apparatus according to claim 2, wherein:
the apparatus further comprises a multi-resolution image obtaining means for obtaining a plurality of images having different resolutions by multi-resolutioning an image within the discrimination region; and
the characteristic amount obtaining means and the evaluation value calculation means are means for obtaining the characteristic amount and calculating the evaluation value for each of the plurality of images respectively.

6. The image processing apparatus according to claim 2, wherein:
the apparatus further comprises a coordinate transformation means for transforming an image within the discrimination region from an image represented in a rectangular coordinate system into an image represented in a polar coordinate system with respect to the arbitrary point; and
the characteristic amount obtaining means is a means for obtaining the characteristic amount using the image within the discrimination region coordinate-transformed and represented in the polar coordinate system.

7. The image processing apparatus according to claim 2, wherein the contour determination means is a means for determining the contour using a graph cuts algorithm.

8. The image processing apparatus according to claim 2, wherein the particular region is a tumor area in a medical image.

9. The image processing apparatus according to claim 1, wherein the evaluation function is a function capable of evaluating whether or not each pixel is a pixel representing the contour using discrimination results provided by a plurality of weak classifiers that evaluates whether or not each pixel is a pixel representing the contour.

10. The image processing apparatus according to claim 1, wherein the contour determination means is a means for determining the contour using a graph cuts algorithm.

11. The image processing apparatus according to claim 1, wherein the adjacent region has a rectangular shape.

12. The image processing apparatus according to claim 4, wherein:
the apparatus further comprises a coordinate transformation means for transforming an image within the discrimination region from an image represented in a rectangular coordinate system into an image represented in a polar coordinate system with respect to the arbitrary point; and the characteristic amount obtaining means is a means for obtaining the characteristic amount using the image within the discrimination region coordinate-transformed and represented in the polar coordinate system.

13. The image processing apparatus according to claim 4, wherein the contour determination means is a means for determining the contour using a graph cuts algorithm.

14. The image processing apparatus according to claim 6, wherein the contour determination means is a means for determining the contour using a dynamic programming method.

15. The image processing apparatus according to claim 9, wherein:
the apparatus further comprises a coordinate transformation means for transforming an image within the discrimination region from an image represented in a rectangular coordinate system into an image represented in a polar coordinate system with respect to the arbitrary point; and
the characteristic amount obtaining means is a means for obtaining the characteristic amount using the image within the discrimination region coordinate-transformed and represented in the polar coordinate system.

16. The image processing apparatus according to claim 9, wherein the contour determination means is a means for determining the contour using a graph cuts algorithm.

17. The image processing apparatus according to claim 12, wherein the contour determination means is a means for determining the contour using a dynamic programming method.

18. An image processing method for determining a contour of a particular region in an input image, comprising:
performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;
setting an arbitrary point within the particular region in the input image;
setting a discrimination region in the input image, which includes the particular region, with reference to the set arbitrary point;
obtaining a characteristic amount of each pixel within the set discrimination region;
calculating, using the evaluation function, an evaluation value that indicates whether or not each pixel within the discrimination region is a pixel representing the contour based on the obtained characteristic amount thereof; and
determining the contour using the calculated evaluation value, wherein the characteristic amount is combinations of intensity values of a plurality of different pixels within an adjacent region to a target pixel from which the characteristic amount is to be obtained.

19. An image processing method for determining a contour of a particular region in an input image, comprising:
performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;
setting an arbitrary point within the particular region in the input image;

setting a discrimination region in the input image, which includes the particular region, with reference to the set arbitrary point;

obtaining a characteristic amount of each pixel within the set discrimination region;

calculating, using the evaluation function, an evaluation value that indicates whether or not each pixel within the discrimination region is a pixel representing the contour based on the obtained characteristic amount thereof; and determining the contour using the calculated evaluation value, wherein the characteristic amount is intensity information within a one-dimensional intensity profile extending from a target pixel from which the characteristic amount is to be obtained to an arbitrary direction within the discrimination region.

20. An image processing method for determining a contour of a particular region in an input image, comprising:

performing machine learning in advance for learning a characteristic amount of each pixel in a plurality of sample images, each including a particular region with a known contour, and obtaining an evaluation function capable of evaluating whether or not each pixel is a pixel representing the contour based on the characteristic amount thereof;

setting an arbitrary point within the particular region in the input image;

setting a discrimination region in the input image, which includes the particular region, with reference to the set arbitrary point;

obtaining a characteristic amount of each pixel within the set discrimination region;

calculating, using the evaluation function, an evaluation value that indicates whether or not each pixel within the discrimination region is a pixel representing the contour based on the obtained characteristic amount thereof; and determining the contour using the calculated evaluation value, wherein the characteristic amount is intensity information within a one-dimensional intensity profile that combines a one-dimensional intensity profile extending from the arbitrary point to the direction passing through a target pixel from which the characteristic amount is to be obtained with a one-dimensional intensity profile extending from the arbitrary point to another direction.

\* \* \* \* \*